Patented June 26, 1923.

1,460,315

UNITED STATES PATENT OFFICE.

GUILLAUME DE MONTMOLLIN, JOSEF SPIELER, AND GÉRALD BONHÔTE, OF BASEL, SWITZERLAND, ASSIGNORS TO SOCIETY OF CHEMICAL INDUSTRY IN BASLE, OF BASEL, SWITZERLAND.

DYESTUFFS OF THE TRIARYLMETHANE SERIES AND PROCESS OF MAKING SAME.

No Drawing.   Application filed November 22, 1921.   Serial No. 517,045.

*To all whom it may concern:*

Be it known that we, GUILLAUME DE MONTMOLLIN, JOSEF SPIELER, and GÉRALD BONHÔTE, all three citizens of the Swiss Republic, and residents of Basel, Switzerland, have invented new and useful Dyestuffs of the Triarylmethane Series and Processes of Making Same, of which the following is a full, clear, and exact specification.

The invention consists in the manufacture of dyestuffs of the triaryl-methane series by causing an aryl-chloroform of the formula

wherein the arylnucleus may still contain other substituents, as for instance phenyl-chloroform, naphthyl-choloroform, chlorophenyl-chloroforms, chloronaphthyl-chloroforms, etc., to act, in presence of a substance adapted to neutralize or bind an acid, on an alphanaphthol derivative having a free 4-position. It is advantageous that the reaction should occur in presence of a catalyst. As the substance capable of neutralizing or binding an acid there may be used, for example, caustic soda, or, in general, an oxide, an hydroxide or a carbonate, of an alkali metal or an alkaline earth metal or magnesium.

The dyestuffs thus obtained are when dry dark powders which dissolve in caustic alkali lye yielding solutions which vary from greenish-blue to green, and in strong sulfuric acid yielding solutions which vary from brown to dark blue. Among the dyestuffs obtainable, those derived from 1-naphthol-2-carboxylic acid are of particular interest. They dye wool grey tints which when afterwards chromed pass to green becoming fast to fulling and perfectly fast to potting. These new dyestuffs also give fast green tints on wool previously mordanted with chromium salts, and also when used by the different processes in which dyeing and chroming are performed in one and the same operation. These new dyestuffs also give fast green tints when printed on fabrics with chromium salts.

The following examples illustrate the invention, the parts being by weight:—

Example 1.

576 parts of alpha-naphthol are dissolved in a mixture of 1100 parts of caustic soda lye of 30 per cent strength and 1000 parts of water. There are then added 390 parts of phenyl-chloroform and the whole is stirred until the phenyl-chloroform has completely disappeared. The mass is poured into 2000 parts of water and the dyestuff formed is completely precipitated by adding a little common salt.

Example 2.

752 parts of 1-naphthol-2-carboxylic acid are dissolved in 2250 parts of caustic soda lye of 30 per cent strength and 160 parts of water. There are then added 390 parts of phenyl-chloroform and 0.5 part of copper powder; the mixture is stirred until the whole of the phenyl-chloroform has disappeared. The mass is then diluted with 7000 parts of a solution of common salt of 12 per cent strength and left at rest for 24 hours. The new dyestuff is precipitated in the form of a dark powder of metallic lustre which is filtered and dried. It dissolves in concentrated sulphuric acid to a blue solution and in water to a brown solution; if there be added to the latter solution some drops of caustic soda lye the solution turns to bluish-green.

The dyestuff gives on wool and when printed on cotton, with aid of chromium mordants, green tints of excellent fastness.

The same dyestuff is produced if lime or magnesia is substituted for the caustic soda.

If instead of phenyl-chloroform its substitution products be used, such as the several chlorophenyl-chloroforms or chloronaphthyl-chloroforms, such as 1-chloro-2-naphthyl-chloroform, there are formed analgous products; if instead of 1-naphthol-2- carboxylic acid, its sulpho-derivatives are used, such as 1-naphthol-7-sulpho-2-carboxylic acid, corresponding sulphonated dye-stuffs are obtained.

What we claim is:—

1. The herein described process for the manufacture of dyestuffs of the triarylmethane series, consisting in acting on an alphanaphthol derivative having a free 4-position with an aryl-chloroform, in presence of a substance capable of binding an acid.

2. The herein described process for the manufacture of dyestuffs of the triarylmethane series, consisting in acting on an alphanaphtholderivative having a free 4-position with an aryl-chloroform, in presence of a catalyst and of a substance capable of binding an acid.

3. The herein described process for the manufacture of dyestuffs of the triarylmethane series, consisting in acting on an alphanaphtholderivative having a free 4-position with phenyl-chloroform, in presence of a substance capable of binding an acid.

4. The herein described process for the manufacture of dyestuffs of the triarylmethane series, consisting in acting on an alphanaphtholderivative having a free 4-position with phenyl-chloroform, in presence of a catalyst and of a substance capable of binding an acid.

5. The herein described process for the manufacture of dyestuffs of the triarylmethane series, consisting in acting on a naphtholderivative having a free 4-position and containing at least a carboxyl group, with phenyl-chloroform, in presence of a substance capable of binding an acid.

6. The herein described process for the manufacture of dyestuffs of the triarylmethane series, consisting in acting on a naphtholderivative having a free 4-position and containing at least a carboxyl group, with phenyl-chloroform, in presence of a catalyst and of a substance capable of binding an acid.

7. The herein described process for the manufacture of dyestuffs of the triarylmethane series, consisting in acting on alphanaphthol-2-carboxylic acid with an aryl-chloroform, in presence of a substance capable of binding an acid.

8. The herein described process for the manufacture of dyestuffs of the triarylmethane series, consisting in acting on alphanaphthol-2-carboxylic acid with an aryl-chloroform, in presence of a catalyst and of a substance capable of binding an acid.

9. The herein described process for the manufacture of dyestuffs of the triarylmethane series, consisting in acting on alphanaphthol-2-carboxylic acid with phenyl-chloroform, in presence of a substance capable of binding an acid.

10. The herein described process for the manufacture of dyestuffs of the triarylmethane series, consisting in acting on alphanaphthol-2-carboxylic acid with phenyl-chloroform, in presence of a catalyst and of a substance capable of binding an acid.

11. The herein described process for the manufacture of dyestuffs of the triarylmethane series, consisting in acting on alphanaphthol-2-carboxylic acid with phenyl-chloroform, in presence of a substance capable of binding an acid.

12. The herein described process for the manufacture of dyestuffs of the triarylmethane series, consisting in acting on alphanaphthol-2-carboxylic acid with phenyl-chloroform in presence of a catalyst and of a substance capable of binding an acid.

13. As new products the herein described dyestuffs of the triarylmethane series derived from an aryl-chloroform, and alpha-naphthol-2-caryboxylic acid, which constitute, in a dry state, deep powders, soluble in water containing caustic soda lye with green blue and in concentrated sulfuric acid with deep-blue coloration and dyeing wool gray tints turning, on subsequent chroming on the fibre, to a green fast to fulling and potting.

14. As new products the herein described dyestuffs of the triarylemethane series derived from phenyl-chloroform, and alpha-naphthol-2-carboxylic acid, which constitute, in a dry state, deep powders, soluble in water containing caustic soda lye with green-blue and in concentrated sulfuric acid with deep-blue coloration and dyeing wool grey tints turning, on subsequent chroming on the fibre, to a green fast to fulling and potting.

15. As new product the herein described dyestuff of the triarylmethane series derived from phenyl-chloroform and alphanaphthol-2-carboxylic acid, which constitutes, in a dry state, a deep powder, soluble in water containing caustic soda lye with green-blue and in concentrated sulfuric acid with deep-blue coloration and dyeing wool grey tints turning, on subsequent chroming on the fibre, to a green fast to fulling and potting.

In witness whereof we have hereunto signed our names this 9th day of November, 1921, in the presence of two subscribing witnesses.

GUILLAUME DE MONTMOLLIN.
JOSEF SPIELER.
GÉRALD BONHÔTE.

Witnesses:
  FRIEDRIC KURZ,
  AMAND RILLER.